US 6,912,591 B2

(12) United States Patent
Lash (10) Patent No.: US 6,912,591 B2
(45) Date of Patent: Jun. 28, 2005

(54) SYSTEM AND METHOD FOR PATCH ENABLED DATA TRANSMISSIONS

(75) Inventor: Thomas D. Lash, Fairfax, VA (US)

(73) Assignee: Science Application International Corporation, San Diego, CA (US)

(*) Notice: Subject to any disclaimer, the term of this patent is extended or adjusted under 35 U.S.C. 154(b) by 769 days.

(21) Appl. No.: 09/846,253

(22) Filed: May 2, 2001

(65) Prior Publication Data

US 2002/0188665 A1 Dec. 12, 2002

(51) Int. Cl.$^7$ .................. G06F 15/16; G06F 15/167
(52) U.S. Cl. .................. 709/246; 709/215; 709/247
(58) Field of Search .................. 709/215, 247, 709/203, 217, 218, 219, 225, 229, 246; 707/204; 713/201; 342/357.1

(56) References Cited

U.S. PATENT DOCUMENTS

| | | | |
|---|---|---|---|
| 5,832,520 A | | 11/1998 | Miller |
| 5,859,971 A | * | 1/1999 | Bittinger et al. ............ 709/218 |
| 5,946,697 A | | 8/1999 | Shen .......................... 707/104 |
| 6,021,426 A | | 2/2000 | Douglis et al. ............. 709/200 |
| 6,148,340 A | * | 11/2000 | Bittinger et al. ............ 709/203 |
| 6,167,407 A | | 12/2000 | Nachenberg et al. |
| 6,401,239 B1 | | 6/2002 | Miron ......................... 717/11 |
| 6,516,349 B1 | * | 2/2003 | Lieberman ................. 709/225 |
| 6,535,894 B1 | * | 3/2003 | Schmidt et al. ............ 707/204 |
| 6,664,922 B1 | * | 12/2003 | Fan ........................... 342/357.1 |
| 6,681,327 B1 | * | 1/2004 | Jardin ........................ 713/201 |

OTHER PUBLICATIONS

"RTPatch Technology Overview" white paper report, printed from Pocket Soft, Inc. at www.pocketsoft.com/whitepaper.html, published 2000.

Douglis, Fred, et al., "The AT&T Internet Difference Engine: Tracking and Viewing Changes on the Web," *World Wide Web*, vol. 1, No. 1, 29 pp., Jan., 1998.

International Search Report for Application No. PCT/US02/13374, dated Aug. 9, 2002 (mailing date).

Written Opinion for Application No. PCT/US02/13374, dated Nov. 8, 2002 (mailing date).

Preliminary Examination Report for Application No. PCT/US02/13374, dated Apr. 14, 2003 (mailing date).

* cited by examiner

*Primary Examiner*—Patrice Winder
(74) *Attorney, Agent, or Firm*—Kilpatrick Stockton LLP

(57) ABSTRACT

A system and method relating to techniques to efficiently update data transmissions, and more particularly to a system and method for using patch enabling Web traffic or Web Internet transmissions, using existing infrastructure so that "difference" information can be sent to an application rather than a complete updated data set, therefore increasing the effective bandwidth along the transmission medium/channel. A proxy server tracks previous versions of content being sent to various clients. In the case where this is new data to the requesting client, then the proxy server sends back the most recent version of this data to the client. If the requested data is an updated version of something already stored in cache on the client side (i.e., data already known to be sent to the client), then the proxy server runs a differencing algorithm and generates a binary patch file identifying steps to perform to update the information. If there is no version of the requested information already on server side and client side, then the entire information packet is sent to the client. Both the server and client must be "patch-enabled".

33 Claims, 3 Drawing Sheets

SYSTEM AND METHOD FOR PATCH ENABLED DATA TRANSMISSIONS

BACKGROUND OF THE INVENTION

1. Field of the Invention

The present invention relates to a system and method for efficiently updating data transmissions, and more particularly to a system and method for using patch enabling Web traffic or Web Internet transmissions, using existing infrastructure so that "difference" information can be sent to an application rather than a complete updated data set, therefore increasing the effective bandwidth along the transmission medium/channel. In this context, a "patch" is a data file containing instructions for updating obsolete data to current data by focusing on the differences (i.e., "difference information") between the old data and new data.

2. Description of the Related Art

A global network of computers available to the public (also known as The Internet) is a vast collection of interconnected public and private networks that all use TCP/IP (Transmission Control Protocol/Internet Protocol). The network that we know as "the Internet" evolved from the ARPANET project (Advanced Research Projects Agency Network developed in the late 1960's and early 1970's by the U.S. Department of Defense as an experiment in wide-area-networking that would survive a nuclear war). This global network now connects roughly tens of thousands of independent networks into a vast global network of computers. In addition, there are many proprietary, or private, networks (intranets) of computers utilizing various network technologies, including TCP/IP, for content (data) sharing, transmission and viewing. The World Wide Web makes up a portion of information available on the afore-mentioned global network. Proprietary intranets also typically utilize Web technologies for the sharing/transfer of data. The term "WWW" is frequently used when referring to the public, global network known as "the Internet", for the whole constellation of resources that can be accessed using a variety of access tools and protocols (e.g., Gopher, FTP, HTTP, telnet, USENET, WAIS, etc.). More precisely, the WWW is the universe of hypertext servers (HTTP servers) which are the servers that allow text, graphics, sound files, etc. to be mixed together. A Web, in general, as opposed to the "World Wide" Web, is the universe of hypertext servers (HTTP servers) which are the servers that allow text, graphics, sound files, etc. to be mixed together, where the servers are part of an intranet, or network of computers not necessarily connected to a global, public network. There are a variety of Web browsers available that allow a user to view content formatted for Hypertext Transfer Protocol (HTTP) transmissions such as HTML (Hypertext Mark-up Language) and XML (eXtensible Mark-up Language). Typically, a separate process or application is used for other protocols, for instance, ftp (file transfer protocol), but some browsers/applications may be multi-functional.

In the context of network transmissions, the following definitions are helpful to understand:

Browser: A Client program (software) that is used to look at various kinds of network resources.

Client: A software program that is used, for example, on an individual computer, to contact and obtain data from a Server software program on another computer, often across a great distance. Each Client program is designed to work with one or more specific kinds of Server programs, and each Server requires a specific kind of Client. A Web Browser is a specific kind of Client.

Server: A computer, or a software package, that provides a specific kind of service to client software running on other computers. The term can refer to a particular piece of software, such as a WWW server, or to the machine on which the software is running, e.g., "Our mail server is down today, that's why e-mail is not getting out." A single server machine could have several different server software packages running on it, thus providing many different servers to clients on the network. Also, a server may be a computer or device on a network that manages network resources. For example, a file server is a computer and storage device dedicated to storing files. Any user on the network can store files on the server. A print server is a computer that manages one or more printers, and a network server is a computer that manages network traffic. A database server is a computer system that processes database queries. Servers are often dedicated, meaning that they perform no other tasks besides their server tasks. On multiprocessing operating systems, however, a single computer can execute several programs at once. A server in this case could refer to the program that is managing resources rather than the entire computer.

Proxy Server: A server that sits between a client application, such as a Web browser, and a real server. It intercepts all requests to the real server to see if it can fulfill the requests itself. If not, it forwards the request to the real server. Proxy servers have two main purposes: (1) improve performance of the overall system and the client, and (2) filter requests.

In network transmission today, a user employs a Web browser on a client to access content, or data, on a server. Often, the client will connect to a global, public network through a Web proxy server. This connectivity gives administrators, or in the case of the global network called the Internet, Internet service providers (ISPs) the capability to filter Web traffic or to block users from accessing certain sites and to log user activity. It gives them a central point of entry out to the network. Users often access the same sites, and are often requesting the same content. ISPs found that rather than retrieving data from the WWW every time to provide user requested content, they would keep a copy of frequently requested content stored locally on the proxy server. This technique is called caching. In this context, caching is the copying of data retrieved from the Internet onto storage associated with the proxy server so that it can be provided to additional users who request it without going back out to the public Internet. Thus, after one user requested data/content, each additional user who asks for it receives content directly back from the Web proxy server without going out to the public Internet. Any one of the proxy servers can do the caching. It should be understood that this method of caching may be performed on a variety of networks including public, global networks and proprietary intranets.

The proxy server can be run at various places along a user's path out to the public Internet. It is often run in an enterprise environment, often from a local area network (LAN) and has a LAN-WAN (wide area network) connection. From one's office to the enterprise network it probably also has a proxy server from the enterprise network out to public Internet. Large service providers generally have proxy servers between their connection to the outside world and their interconnection right at that interface. For instance, if a user dials into an ISP, the user does not have his own proxy server; the ISP has one. If one is logged into the Internet through a corporate computer, the proxy server then would be on the user's side and not on the ISP side.

Often there are proxy servers on the ISP side and proxy servers on the user's side, if connected to a LAN (i.e., at the office), or wherever the user's office connects to the next higher level of connectivity. Generally, the LAN would connect to the WAN and probably there would be a proxy server there for logging purposes and for traffic flow purposes.

Web browsers, currently have caching functionality built into them; they save certain files locally, in cache, as well. So, in current deployments, cache is provided both on the client side and on the Web proxy side. However, there is not an efficient method for simply updating the cache that is on the browser side. More specifically, if new content is obtained from the WWW and used to update the proxy cache, the proxy cache becomes more recent than the browser cache. A typical example of caching technology is described below. The user requests information. If the document in local browser's cache is not current, an HTTP request to a proxy server is made. The Web Proxy server checks content cache to see if valid content is stored locally. If content is stored at the proxy server and still valid, the proxy server returns local copy of data to the client. If content is outdated or not in proxy cache, the proxy server accesses the requested URL (uniform resource locator) on the World Wide Web to retrieve data. Data is returned to client, and stored in cache for subsequent retrievals.

Caching techniques save bandwidth by serving data stored locally on either an Internet client or proxy server. A common scenario is that multiple clients are routed through a common proxy server on a corporate LAN or consumer Internet Service Provider. When a client makes an Internet request through the proxy server, the server saves a copy of the content delivered to the client. If another client requests the same data in a sufficiently small amount of time, the proxy server does not go out to the Internet to retrieve the data, it simply serves the local copy requested by the first client. If the data requested were to become "stale" or no longer valid, the proxy server will have to retrieve the information from the Internet, store a copy for later use, and serve the content requested by the second client. If the first client now requests an updated version of the same content, the entire content must be re-sent because it is no longer valid.

Patching has been prevalent for more than a decade as an efficient mechanism for updating application software. Patching is currently used mostly for application software updates. Users commonly apply operating system updates or application software updates to fix software "bugs" or to prevent security violations. One example of patching is the process used by Pocket Soft, Inc. for its RTPatch® software (RTPatch® is a registered trademark of Pocket Soft, Inc.), and it describes the process of how two files may be compared to create a difference file or a patch. Other forms of patching may be commercially available which may differ in terms of specific methodology, but provide the same or substantially the same function. U.S. Pat. Ser. No. 5,832,520 to Miller, the subject matter of which is herein incorporated in its entirety, is exemplary of current patching technology, which is the process of taking two files and creating a difference file. However, Miller does not discuss applications of the patching technology, and instead is specific to the patching algorithm only. Miller also fails to address architectures that patch files may be well suited for.

Turning again to the specific form of patching provided by RTPatch® software, it is noted that Pocket Soft originally had a product that helped memory allocation and DOS based applications. In the mid-1980's, developers were looking for ways to flatten memory space and get around the limitations of DOS. Pocket Soft was sending out its own software updates so quickly and the updates were so voluminous that it developed the patching technology in order to help save distribution costs of updating memory allocation software. In the late 1980's Pocket Soft commercialized its patching technology as RTPatch®.

Thus, patch technology was developed for and is used currently for updating software applications and versioning. Current patching is typically canned. In other words, someone makes a decision that users are going to upgrade from version 1 to version 2 or they're going to upgrade from version 1 directly to version 3. Patch software is manually driven; it is GUI (graphic user interface) driven; and it is Wizard driven. Typically, a user executes the software and takes version 1 and version 2 of a software application and generates a patch file.

In a hybrid manual and automatic process, there is created a specific difference file. When a user requests a version update, the appropriate difference file is sent based on whatever version the user has loaded. However, the user must physically tell the server what version they have and what version they want to update. The correct file is then sent based on the predetermined choices made as to how users are expected to upgrade.

As described herein, the limitations of patching for use in updating software are overcome, and by novel and innovation to patching, it has been unexpectedly discovered that patching is not limited to the specific prior art uses, and new uses and specific methods and systems for patching are disclosed.

BRIEF SUMMARY OF THE INVENTION

Client-side caching is a technique used in every commercial Web browser. One technology that is relatively new is server-side caching, and many corporate Internet users and ISPs are using server-side caching as a way to reduce the need to access data from the Internet. By modifying and integrating these technologies in an innovative way, a system is provided which dramatically improves bandwidth usage on existing networks.

In the context of the system and method described herein, it is important to appreciate that the quality of wireless content available to corporate and personal users is currently constrained by bandwidth allocated to cellular and digital communications. There is currently no mechanism for simply updating the invalid content the client already has in its local cache. There is thus provided a method of using the existing bandwidth and infrastructure more efficiently to allow service providers to gain additional capacity and deliver higher quality content and services to users.

In one specific aspect, a "patching" technique described herein involves updating dynamic content to Internet users. While other applications requiring transmissions to a user may be patched using the present invention, one embodiment is applied toward wireless Internet transmissions. Small binary "patches" are generated on a central Web server, transmitted to the requesting client, and applied on a client's device or Web browser to update older content already saved locally. This transmission strategy is ideal for an environment that is bandwidth-constrained, with mostly static but some dynamic content. Wireless Internet service fits this profile well, and it is currently a rapidly expanding market.

More specifically, the user requests information (i.e., data, a Web page, a calculation, etc.) from the network (Internet or intranet). Differences between current information residing on a client and new related information residing on a server are automatically identified by the Web proxy server when a user on a client requests new information. A difference file is generated on the server using the identified differences. The difference file is transmitted to the client, and then the current information is updated using the difference file, resulting in updated information on the client.

The Web proxy server automatically checks to make sure that this calculation or request is based on the current information. The browser queries the Web proxy server or other server for the information. The Web proxy server is responsible for determining whether to go out to the network for that data or return data that it has stored locally, in cache, to the client. If the proxy server does not have the appropriate information in cache, it goes out to the network and obtains it. The proxy server has tracked previous versions of the same content that it had sent to the client. In the case where this is new data to the client then the proxy server sends back the most recent version of this data to the client browser. If the requested data is an updated version of something already stored in cache on the browser side (i.e., data already known to be sent to the client), then the proxy server generates a binary patch file identifying steps to perform to update the information by running a differencing algorithm. If there is no version of the requested information already on server side and client side, then the entire information packet is sent to the client.

BRIEF DESCRIPTION OF THE DRAWINGS

The accompanying drawings, which are incorporated in and form part of the specification, illustrate preferred embodiments of the present invention and, together with the description, disclose the principles of the invention. In the drawings.

DETAILED DESCRIPTION OF THE INVENTION

The quality of wireless content available to corporate and personal users is currently constrained by bandwidth allocated to cellular and digital communications. Ultimately, additional bandwidth will be available to wireless users, but service providers will spend billions of dollars to license frequency spectra large enough to serve broadband requirements. Until such time, more efficient use of existing bandwidth and infrastructure will allow service providers to gain additional capacity and deliver higher quality content and services to users.

Implementing patching at the content delivery level is a unique hybridization of mature technologies. The patching technique of the present invention is a unique method for efficiently updating dynamic content to Internet or other large network users. While the description herein often refers to a global, public network of computers, such as the network known as the Internet, it will be apparent to one skilled in the art that any network utilizing Web browsing or similar methods of retrieving information are contemplated as alternative embodiments.

Figure 1:
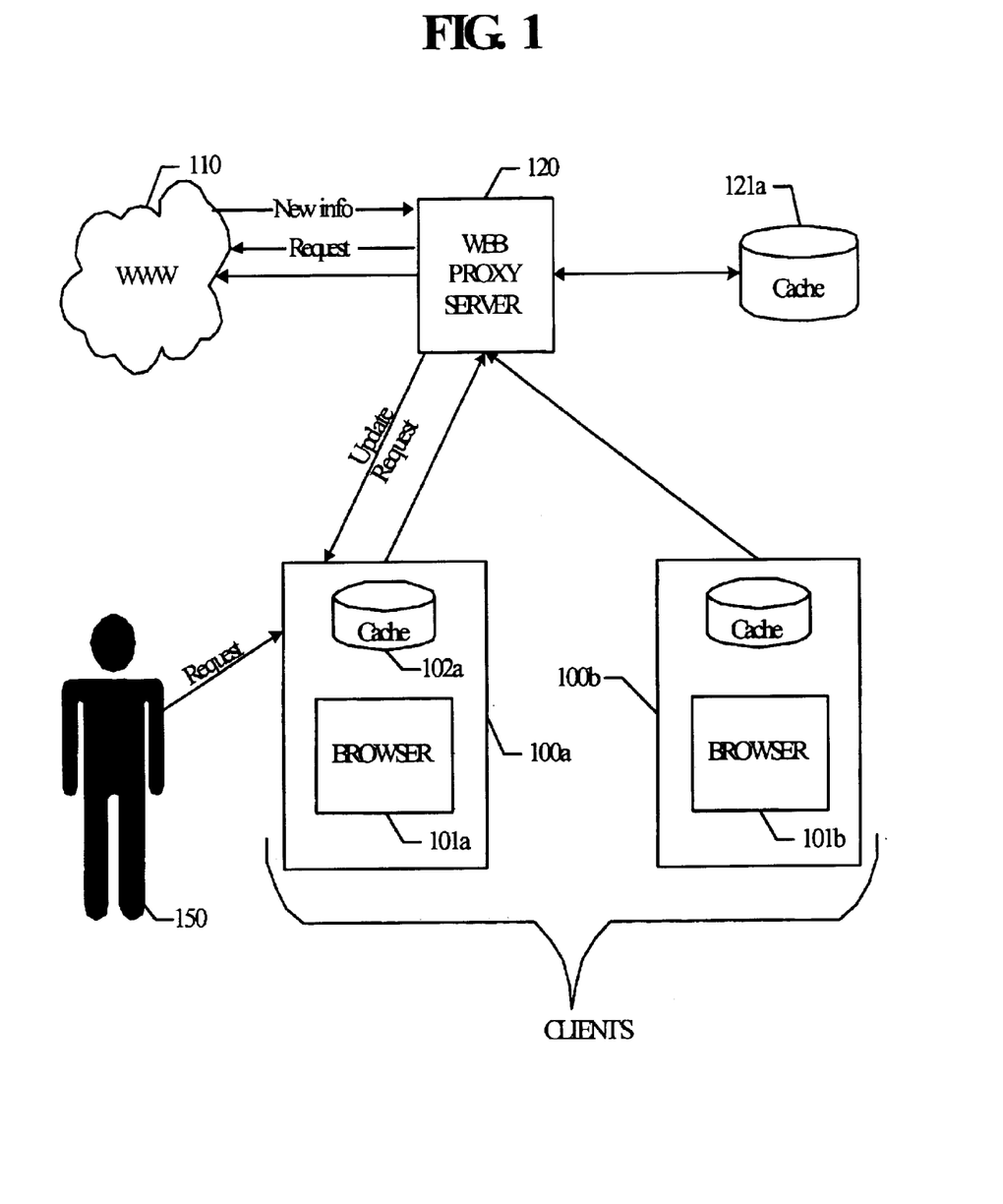
FIG. 1 is a block diagram illustrating the system for updating a client's information with a patch, as described herein.

Referring now the drawings, and in particular to FIG. 1, there is shown a block diagram of the system described herein. A user 150 on a client 100*a* requests information from the World Wide Web (WWW or Web) 110. A determination is made on the client 100*a* in the Web browser process 101*a* as to whether the requested information currently resides in cache 102*a* on the client 100*a* or whether the request is to be passed on to the Web proxy server 120. If the information does not reside locally on the client 100*a*, then the Web proxy server 120 determines whether the information resides in cache storage 121*a* on the proxy server 120. If so, this information is passed to the client. If not, the new information is retrieved from the WWW 110. If the Web proxy server has a previous, but outdated, version of the requested information in cache, and it is known that the client also has this outdated version in local cache, then the two versions are automatically compared on the proxy server and a difference file is created.

The difference file is small binary "patch" generated on a central Web proxy server 120, transmitted to the requesting client 100*a*, and applied on the client's device or Web browser 101*a* to update older content already saved locally. Any algorithm which compares the two files and generates a file with instructions for modifying the old information to create the new information can be used. In one embodiment the RTPatch® software available from Pocket Soft, Inc. is used. This software is integrated into the patch-enabled server and client software with a set of commercially available reusable subroutines/modules. It will be apparent to one skilled in the art how to generate a proprietary patch algorithm either based on the previously discussed Miller patent, or by using a different but readily developed and apparent algorithm, and resultant software routine. This transmission strategy is ideal for an environment that is bandwidth-constrained, with mostly static but some dynamic content. Wireless Internet service fits this profile well, and it is currently a rapidly expanding market.

It is the Web proxy server's responsibility to determine whether to make a patch, and in order to make that decision, the Web proxy server has to be "patch enabled". The Web proxy server executes code written into the Web proxy server that enables it to build a patch based on the fact that it had stored what it sent to the client last time and what it now has in its cache. The difference file is then sent to the client. The client side browser is also patch-enabled. When the difference file is received by the client, the client side browser determines what type of file was received. If the information received is a patch file, then the browser executes the binary instructions of the patch.

This determination can be made based on file type extension, header information in the transmission, or any other commonly used method. It will be apparent to one skilled in the art that once the patch file is created, a number of methods could be used to determine how to execute the patch. It will also be apparent to one skilled in the art how to create a "plug-in" for the browser to do just that. It is noted that what is meant by the term "plug-in" is a term of art, and well known to those of ordinary skill in the art. The browser could then detect the file type that was a patch, rather than an HTML file, know whether it needed to execute the instructions, or just post the page. The patching is transparent to the user because after the information is requested the user sees only the updated information on the page and is not made aware of whether the information has been downloaded in whole from, for example, the Internet, and transferred in its entirety, or whether a patch file was transmitted and then executed by the client side browser.

The system and method disclosed herein provides for automatically determining if data requested is more recent than what the users have, and for generating a patch automatically. There is an assumption made, for the system and method, that the Web proxy server has retained in memory the last version that it sent to the each individual client. There is a logging mechanism by which this proxy server retains information representing the data it sent out to various clients. When a new version is in its cache, it is able to generate that patch file because it has both copies available to it.

The system and method provides a mechanism to enable a virtually infinite supply of custom patches by implementing a tracking system on the server to keep track of which data was sent to which client/user. Current systems do not maintain this information. At most, only the latest pieces of data are stored in cache, and these data are not coordinated with the requesting users. Moreover, in current patching systems, only a small subset of possible patches are available to the user because they are created ahead of time based on decisions made manually.

As discussed in greater detail herein, the Web proxy server tracks what versions of previous content were sent to different clients. This is not done in current patching systems because there is no reason to do so. In one aspect, requests are made from a client to a server and identifying information such as the client's IP address, what port the request came in on and the URL that it requested are embedded in the HTTP request from the client to server. The server stores that information along with the content that it returned to the client for later use. Thus, when the client asked for the same URL again or the same content, the Web proxy server performs a "look-up" on what it had sent previously, recalls the content that it had sent to the client previously and generate a patch between the new content and what it had sent previously to the client. The term "look up" is conventional and well known to those of ordinary skill in the art.

Efficiently storing and indexing client requests is an enhancement to current Web proxy server technology. Currently, there is no need for a proxy server to track what content is returned to individual clients, and therefore this function is not performed. A patch-enabled content delivery system, as described herein, requires that the server track content served to individual clients. Efficient indexing techniques, such as hashing, ensure that servers can quickly access stored information such as previously transmitted content and time persistence. It will be apparent to one of ordinary skill in the art that various tracking techniques may be used by different servers, as long as the patch is sent in a standard format.

In an exemplary embodiment of the system and method described herein, the following information is saved by the proxy server and is useful for tracking or indexing Internet content to distributed clients:

HTTP (Hypertext Transport Protocol) and WAP (Wireless Applications Protocol) header fields, including: (1) content-length, e.g., number of bytes contained in content, useful for quickly checking to see of content has changed; (2) content-type, which designates type of content returned (e.g. "text/html"); (3) Etag, which serves as a unique content identifier, useful for tracking when content has changed; and (4) last-modified, which stores when content was last changed.

Network layer header information including: (1) source and destination addresses; and (2) address of the requested content.

With this information, efficient indexing techniques, such as hashing, can uniquely identify what version of content has been delivered to a client. A client could inform a caching proxy server of what content it has in cache by referring to some or all of the above or related information. It will be apparent to one of ordinary skill in the art that other network transmission protocols may have different header information and that a modification of the actual data to be saved will be necessary.

In an exemplary embodiment that utilizes HTTP requests, a client performs an HTTP request to a caching proxy server. The server satisfies the client's request, saves a copy of the content that was sent to the client, and records relevant metadata related to the transaction. The following HTTP header describes the content returned to the client:

```
HTTP/1.1 200 OK
Date: Wed, 18 Apr 2001 19:08:11 GMT
Server: Apache/1.3.17 (Unix) mod_fastcgi/2.2.10
Last-Modified: Fri, 13 Apr 2001 16:40:13 GMT
ETag: "163e-48a3-3ad72bed"
Accept-Ranges: bytes
Content-Length: 18595
Connection: close
Content-Type: text/html
```

This header information identifies the date and time that the content was served, the date the content was last modified, the "ETag" or unique content identifier, the size of the returned content in bytes, and the document type. From the TCP/IP header, the server could also store the client hardware address to uniquely identify the client.

This information is used to efficiently store and index the referenced content to the requesting client. If the client requested an updated version of the content, the proxy server would be able to efficiently identify and retrieve the content previously served to the client. With a new version of the content retrieved either from cache or from the Internet, the proxy server would be able to produce a patch between the new content and the content previously sent to the requesting client.

One illustrative example of the use of the present invention is in the area of wireless Internet use for receiving financial market data. Users most often use wireless Internet service to receive current stock and financial data. When users access stock quotes, they are interested in the quote itself, and less interested in the background information and header data that is never seen in the Web browser. However, in current wireless transmission strategies, the overhead of HTML (mark-up language) or XML and other content on the page must be retransmitted. Sending only a small patch that updates just the stock quote allows the client to reuse data already transmitted and execute an Internet request much faster than traditional delivery mechanisms.

Some wireless promotion strategies allow advertisers to "push" promotions to users based on their current location using geo-positioning system (GPS) technology. In the context of such promotions, the system and method may be used to download maps of the surrounding area to a user's wireless device once, and daily or hourly promotions can then be sent via a patch to alert consumers of local promotions. Many users would not tolerate the time delays associated with downloading complicated graphics like maps repeatedly. The patching technique described herein allows any changes to the map, such as icons or highlighted routes, and the simple text promotion information to be sent efficiently over a wireless channel.

The method described does not require user intervention in order to receive the appropriate patch (difference) file. The proxy server automatically identifies whether or not there are differences, and if there are differences then it creates a difference file and sends it to the client program. This process is transparent to the user running the program on the client side. The process is not transparent to the client program, e.g., a Web browser, because the client program needs to be "patch enabled" to actually execute the binary patch file to update the differences.

The system and method, through intelligent tracking of Internet requests, is capable of sending small updates to Internet clients rather than re-sending entirely new content when data becomes stale or invalid. As described herein, patching techniques are well suited for generating small updates to older files to make them byte-by-byte compatible with a newer version. The size of a typical patch is approximately 1–5% of the size of original content. In this scenario, a patch-enabled transmission system could update dynamic content over the Internet 95–99% more efficiently than re-sending the entire content. This dramatic increase in bandwidth efficiency translates into a significantly higher "effective" bandwidth for the overall communications channel.

Figure 2:
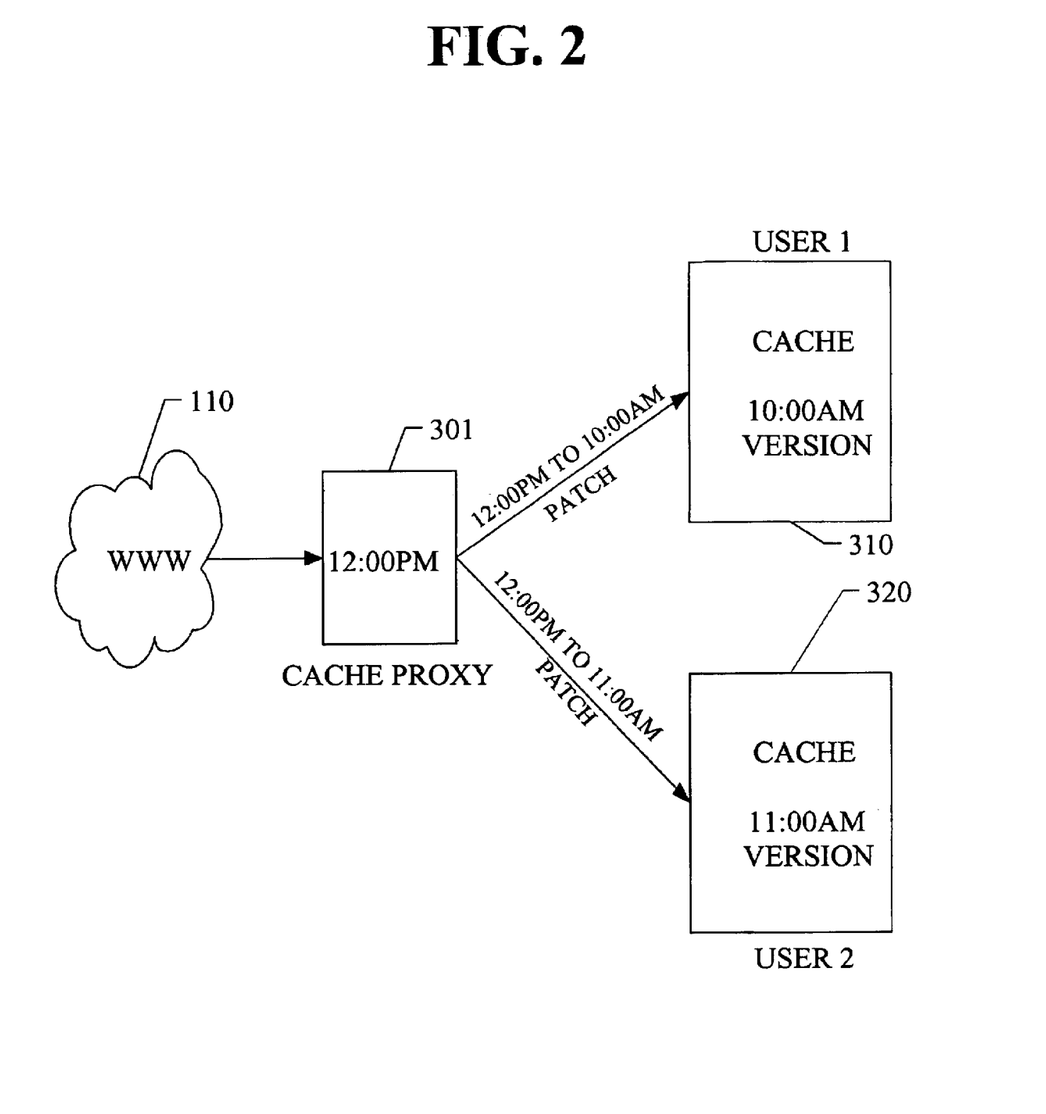
FIG. 2 is a block diagram illustrating the caching implementation described herein for patching timely information.

Referring to FIG. 2, there is shown an exemplary use of the caching of the present invention for patching stock quotes to the users. In this example, a user 310 requests stock quote information at 10:00 AM. The cache proxy 301 sends a stock quote at 10:00 AM to the client/user 310. Another user 320 requests a stock quote at 11:00 AM. The cache proxy 301 then sends a stock quote at 11:00 AM to the client/user 320. Since the 11:00 AM quote is different than the 10:00 AM quote, the cache proxy must retrieve the entire information packet from the WWW 110 and then send the entire time appropriate information packet to each user. The proxy server would have to log that it sent a stock quote at 10:00 to client 310, and a stock quote at 11:00 to client 320. If it is 12:00 PM, and both users request a new stock quote, the proxy server is able to send only a patch to each user instead of the entire information packet.

The proxy server 301 retrieves the 12:00 PM information from the WWW and because it has stored the fact that it sent a certain stock quote at 10:00 to client 310, it generates a patch file between the 10:00 quote and the 12:00 quote to client 310. Since client 320 had the 11:00 information, the proxy server 301 determines the difference between the 11:00 and 12:00 information and generates a patch to the 12:00 from the 11:00 information. If the person at 11:00 had requested an interim update at 11:15 AM, then when requesting an update at 12:00 PM that person receives a patch file to provide the differences between the 11:15 AM and 12:00 PM information.

In contrast, current patching software only provides canned patches. For instance, a patch may have been generated for differences between version 1 and 2 of a software package, and also for an upgrade from version 2 to version 3. If a user wants to upgrade from version 1 to version 3, two (2) incremental patches must be executed; there is not an indefinite supply of patches. Current technology provides the patches are manually generated in advance and then executed by the user.

In building the patch between older content and new content, there is provided a differencing algorithm that looks at the two files byte by byte and determines the most efficient way to update the old file to match the new file, resulting in the "difference file" or "patch file". The difference file is essentially a set of binary instructions that instruct the client to change one or more particular bytes from an original value to an updated value, or change a block of bytes from original values to updated values, or delete a block of bytes from the file altogether, or add bytes to the end, etc. Thus, there is provided a novel method of using that patch, disseminating that patch and updating it from a client cache in a manner not currently performed in the state of the art patching systems. The novel and unexpected ability to hybridize the technologies in the manner disclosed herein makes the system more efficient at updating data for Internet traffic.

Figure 3:
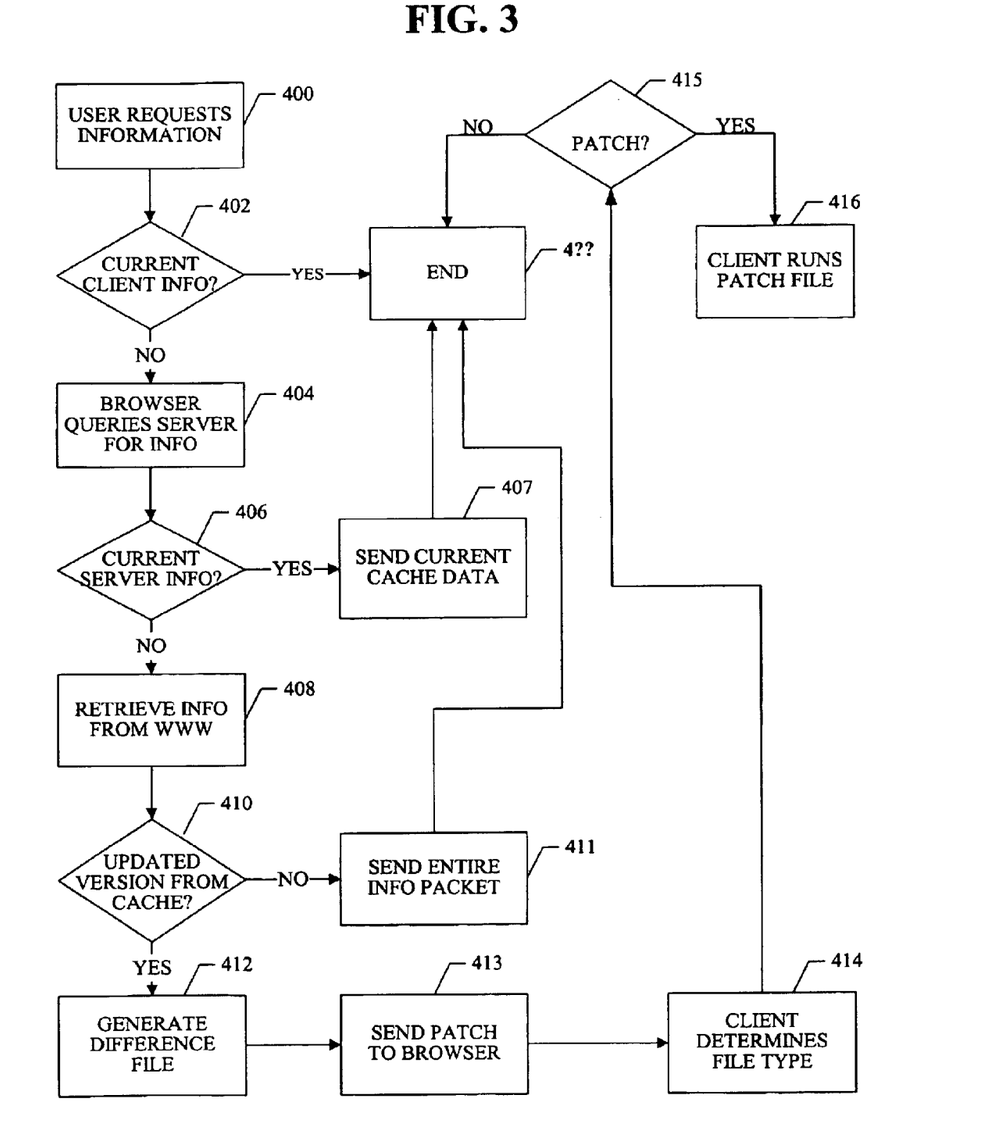
FIG. 3 is a flow diagram illustrating the method for updating a client's information with a patch, as described herein.

Referring to FIG. 3, there is shown a process flow diagram for generating and delivering a patch for a client on the Internet. In step 400, the user requests information via a Web browser (i.e., data, a Web page, a calculation, etc.). This request goes to the Web proxy server after the browser, in step 402, automatically checks to make sure that this calculation or request is based on the current information. In step 404, the browser queries the proxy server or other server for the information. The Web proxy server is responsible for determining whether to go out to the Internet for that data or return data that it is local to the client. In step 406, if the proxy server does not have the appropriate information in cache, it issues a request for the information from the Internet, or other network, and in step 408, obtains the information. The proxy server has tracked previous versions of the same content that it had sent to the client. In the case where this is new data to the client then the proxy server sends back the most recent version of this data to the client browser. If the requested data is an updated version of something already stored in cache on the browser side (i.e., data already known to be sent to the client), as determined in step 410, then the proxy server runs the differencing algorithm—for example, the RTPatch® software—and generates a binary patch file identifying steps to perform to then update the information in step 412. If there is no version of the requested information already on server side and client side, then, in step 411, the entire information packet is sent to the client.

It is the Web proxy server's responsibility to make the decision to make a patch and in order to make that decision, the Web proxy server has to be "patched enabled". It executes code that enables it to build a patch based on the fact that it had stored what it sent to the client last time and what it now has in its cache. The difference file is then sent to the client in block 413.

The client side browser is also patch-enabled. When the difference file is received by the client, in step 414, a determination is made as to what type of file was received. If the information received is a patch file, then in step 415, the browser executes the binary instructions of the patch. This determination can be made based on file type extension, header information in the transmission, or any other commonly used method. For instance, HTTP supports the use of mime types, e.g., different file types so you could flag the incoming data as a Patch as opposed to a file containing HTML content or gif file. The file extension would clue the client into the fact that there was a Patch arriving rather than a new fresh content in its raw form. The difference file may actually tell it what file name to update or what handle to look for to update in its cache. The identification of which file to update could be imbedded in the difference file. The difference file may actually tell it what file name to update or what handle to look for to update in its cache. This information may also be embedded in the HTTP headers along with the mime type. It will be apparent to one skilled in the art that once the patch file is created, a number of methods could be used to determine how to execute the patch. It will also be apparent to one skilled in the art how to create a plug-in for the browser just to do just that. The browser could detect the file type that was a patch rather than an HTML file, know whether it needed to execute the instructions or just post the page.

The patching is transparent to the user because after the information is requested the user sees only the updated information on the page. The user is not made aware of whether the information has been downloaded in whole from the Internet and transferred in its entirety, or whether a patch file was transmitted and then executed by the client side browser as shown in block 416.

One embodiment of the system and method is to implement the patching technology in a low bandwidth environment such as the wireless environment, as it stands today. A benefit is that the client is not waiting for extended periods every time new data is requested, because only smaller amounts of data need to be sent over the wireless frequency. The effective bandwidth of the user's channel is increased by sending smaller bits of information that leverage what is already stored on the local browser.

In another embodiment, the system and method may be used to effect secure transmission. Distributing patches rather than raw content adds a layer of security because the content of the patches sent are irrelevant unless the base information is known. Unless one knows what the previous versions were, instructions on how to update that to the most recent version are useless. Thus, there is an added benefit that if someone has not been tracking every single transaction coming from client to server, and tracking every version of it, they're not going to be able to reconstruct the end product. In a sense, one benefits from an extra level of security. This method may also save additional bandwidth if only the first, or full, transmissions are fully encrypted. Since the patches are useless alone, it may not be necessary to encrypt them at all. In that case, the overhead of encryption is not required for every transmission in a session. These techniques might be useful for military applications, E-commerce, or secure bank transactions where a hacker or other potential of infiltrator would have to be tracking every single transaction in order to reconstruct the end product.

In another embodiment, the system and method may be used for transmission of information to/from a submersible vehicle. Submersibles have low bandwidth under water. In order to get any kind of data transmission they extend a very long antenna that makes them susceptible to other submarines and other people looking for big objects in the water. Submariners tend to keep their data transmissions extremely short and the patches of the present invention would allow them to get more data than they would normally be able to in the same period of time.

The system and method allows for higher quality content over existing infrastructure. For instance, once you download a higher quality image, you could update that image over less time than you would if you had to re-send that image every time. For instance, the online service, AOL, available from America Online, Inc., changes the graphics on their proprietary Web browsers often. The changes are not fundamentally that different, they might change a few things in the graphic to change their logo a little bit. Once a user has a graphic stored locally, if the online service wanted to change their logo and update their graphics, they could patch those graphics to the user and take up less bandwidth and than if they had to re-send complicated graphics every time.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed is:

1. A method for updating information on a client using differences between old information residing on the client and new information retrieved by a server, said method comprising:

requesting, by a client, information from a network;

determining whether the requested information is in storage on the client;

upon the determining that the requested information is in storage on the client, designating the requested information in storage on the client as a first version of the requested information;

retrieving the requested information by a server connected to the network;

designating the retrieved information as a second version of the requested information;

identifying differences between the first version of the requested information residing on the client and the second version of the requested information retrieved by the server;

generating a difference file on the server using the identified differences;

transmitting the difference file to the client;

updating the first version of the requested information using the difference file resulting in updated information on the client; and retaining the second version of the requested information in storage at the server.

2. A method as recited in claim 1, the determining comprises:

determining whether the first version of the requested information resides in storage at the server.

3. A method as recited in claim 2, wherein the identifying differences further comprises:

comparing the second version of the requested information retrieved in the retrieving step with the first version of the requested information residing in storage on the server; and determining automatically, by the server, whether the second version of the requested information is more current than the first version of the requested information in storage on the client and server.

4. A method as recited in claim 3, the the second version of the requested information resides on a content server, the second version of the requested information is retrieved by a proxy server from the content server via a network, and the comparing is performed by the proxy server.

5. A method as recited in claim 4, the client and the proxy server resides on the same computer processor.

6. A method as recited in claim 2, upon the determining that the requested information is not in storage on the client, transmitting the second version of the requested information to the client in response to the requesting by the client.

7. A method as recited in claim 1, further comprising saving information, by the server, the information corresponding to versions of information sent by the server to clients, wherein each of the versions of information is correlated with each of the clients to which it was sent.

8. A method as recited in claim 1, the requesting, by a client, of information from a network, is performed by a user employing a patch-enabled Web browser.

9. A method as recited in claim 1, the requesting of information by a user is from a public, global network of computers, employing a patch-enabled Web browser.

10. A method as recited in claim 1, the requesting of information by a user is from a private or proprietary intranet, employing a patch-enabled Web browser.

11. A method as recited in claim 1, the client connects to the network via a wireless communication method.

12. A method as recited in claim 11, a user on the client executes an application related to geo-positioning system (GPS) technology and the information requested is map data to be transferred to the user's wireless device.

13. A method as recited in claim 11, a user on the client executes an application related to financial markets and the information requested is financial data to be transferred to the user's wireless device.

14. A method as recited in claim 13, the user requests data related to financial markets at unpredictable intervals and wherein the client receives updated current information using the difference file customized to the precise intervals of the requests.

15. A method for effecting secure transmission of data to a client using differences between old information residing on the client and new information residing on a server, said method comprising:

requesting, by a client, information from a network, wherein a user on the client desires secure transmission of the information;

retrieving the requested information, by a server connected to the network, via a secure connection, the server also connected to the client;

saving transactional information, by the server, the transactional information corresponding to versions of the requested information sent by the server to clients, each of the versions of the requested information sent to the clients is correlated with each of the clients to which it was sent, and the versions of the requested information are differentiated from one another by a time at which each of the versions is placed in storage on the client and the server;

determining by the server whether a previous one of the versions of the requested information resides in storage on the client and the server, and if not, then sending the requested information as one of the versions of the requested information to the client via a secure means; and otherwise identifying differences between the previous version of the requested information and one version of the requested information as retrieved in the retrieving;

generating a difference file on the server using the identified differences;

transmitting the difference file to the client; and updating the previous version of the requested information using the difference file resulting in updated information on the client.

16. A method as recited in claim 15, wherein the requested information is sent by the server to the client in encrypted form and the difference file generated is transmitted in unencrypted form.

17. A method of efficient transmission to and from a submersible vehicle, using differences between old information residing on a recipient and new information residing on a sender, said method comprising:

requesting, by a recipient, information from the sender, wherein one of the recipient and sender resides on a submersible vehicle with limited bandwidth or limited accessibility to transmission;

retrieving the requested information, by a server connected to the sender, the server also connected to the recipient via a wireless transmission means;

saving transactional information, by the server, the transactional information corresponding to versions of the requested information sent by the sender to the recipients, each of the version of the requested information sent to the recipients is correlated with each of the recipients to which it was sent;

determining by the server, whether a previous one of the versions of the requested information resides in storage on the recipient and the server, and if not, then sending the requested information as one of the versions of the requested information to the recipient as a whole, and otherwise identifying differences between the previous version of the requested information and the one version as retrieved in the retrieving;

generating a difference file on the server using the identified differences;

transmitting the difference file to the recipient; and updating the previous version of the requested information using the difference file resulting in updated information on the recipient.

18. A method as recited in claim 17, wherein the recipient is a client residing on the submersible vehicle and the server does not reside on the submersible vehicle and is directly connected to the sender.

19. A method as recited in claim 15, wherein the sender resides on the submersible vehicle and is connected to the server and the client does not reside on the submersible vehicle.

20. A method as recited in claim 17, wherein the sender and recipient are interchangeable depending on the direction of the data flow to/from the submersible vehicle and for a specific transmission, thereby effecting bi-directional patching of data.

21. A system for updating information on a client using patches or differences between old information residing on the client and new information residing on the server, comprising:

at least one patch enabled server connectable to a network;

at least one client connectable to a network through the patch enabled server, the patch enabled server connected to the client and enabled to send requests to the network, when connected thereto, for information based on requests for information received by the server from a patch enabled browser on the client, the patch enabled server comprising:

a data store and enabling routine for storing information, the information correlating requested information retrieved from the network with at least one client recipient of the requested information retrieved from the network; and a patch generator for automatically identifying differences in versions of requested information and generating difference files if it is determined by analyzing the information that a previous version of the client requested information resides in storage on the server and the client, and transmitting the difference file to the client, the versions of the requested information are differentiated from one another by a time at which each of the versions is placed in storage on the server.

22. A system as recited in claim 21, wherein the patch enabled browser on the client further comprises:

a patch identifier for identifying whether received information is a binary difference file (patch); and a patch executer which executes the binary patch received from the server and updates the current information on the client using the binary difference file resulting in updated information on the client.

23. A system as recited in claim 22, wherein the client is connected to the server via a wireless transmission path.

24. A system as recited in claim 23, wherein the client is on a submersible vehicle.

25. A system as recited in claim 22, wherein the patch executer is a plug-in module of a patch enabled Web browser.

26. A system as recited in claim 21, wherein the requested information is related to financial markets.

27. A system as recited in claim 21, wherein the information stored in the data store is transactional information to correlate requested information sent by the patch enabled server and received by a client with temporal and recipient identification information.

28. A system as recited in claim 21, wherein the patch enabled server distinguishes temporal and recipient identifying information associated with requested information sent by the patch enabled server and received by at least one of a plurality of client recipients.

29. A system for effecting secure transmissions of data to a client using differences between old information residing on the client and new information residing on the server, comprising:

at least one patch enabled server connectable to a network;

at least one client connectable to a network through the patch enabled server, the patch enabled server connected to the client and enabled to send requests to the network for information based on requests for information received by the server from a patch enabled browser on the client, wherein a patch enabled server comprises:

a data store and enabling routine for storing transactional information, the transactional information correlating requested information retrieved from the network with one or more client recipients of the requested information retrieved from the network; and a patch generator for automatically identifying differences in versions of requested information and generating difference files if it is determined by analyzing the transactional information that a previous version of the client requested information resides in storage on the server and the client, and transmitting the difference file to the client, but if a previous version of the client requested information does not reside on both the server and client, then securing the non-patch information to be sent to the client, the versions of the requested information are differentiated from one another by a time at which each of the versions is placed in storage on the server.

30. A system as recited in claim 29, wherein the non-patch information is secured by using encryption.

31. A system for updating information on a client using differences between old information residing on the client and new information residing on the server, comprising:

a network of computers supporting client/server technology;

a content source connected to the network, the content source having a unique identifier allowing content to be accessed across the network;

a server connected to the network providing a conduit for users, the server processing requests by users for retrieving data from a content source;

a client connected to the network through the server for providing requested content to a user, wherein the server sends requests to the network for information based on requests for information received by the server from the client, and wherein the server comprises:

a data store and enabling routine for storing transactional information, the transactional information correlating requested content retrieved from the network with at least one client recipients of the requested content retrieved from the network; and a patch generator for automatically identifying differences in versions of requested content and generating difference files if it is determined by analyzing the transactional information that a previous version of the client requested content resides in storage on the server and the client, and transmitting the difference file to the client, the versions of the requested information are differentiated from one another by a time at which each of the versions is placed in storage on the server.

32. A system as recited in claim 31, wherein the client further comprises;

a patch identifier for identifying whether received information is a binary difference file (patch); and a patch executer for executing the binary patch received from the server and for updating the current content on the client using the binary difference file resulting in updated content on the client.

33. A system as recited in claim 32, wherein the client is connected to the network via a wireless transmission path.

* * * * *

UNITED STATES PATENT AND TRADEMARK OFFICE
CERTIFICATE OF CORRECTION

PATENT NO. : 6,912,591 B2  
DATED : June 28, 2005  
INVENTOR(S) : Thomas D. Lash It is certified that error appears in the above-identified patent and that said Letters Patent is hereby corrected as shown below:

Column 12,  
Line 49, please change "A method as recited in claim 3, the the second version" to -- A method as recited in claim 3, the second version --.

Column 14,  
Line 15, please change "otherwise" to -- otherwise; --.

Signed and Sealed this

Twenty-second Day of November, 2005

JON W. DUDAS  
*Director of the United States Patent and Trademark Office*